United States Patent [19]

Schmoock

[11] Patent Number: 4,567,775

[45] Date of Patent: * Feb. 4, 1986

[54] UNITARY ELECTROMAGNETIC FLOWMETER HAVING MOLDED ELECTRODES

[75] Inventor: Roy F. Schmoock, Yardley, Pa.

[73] Assignee: Fischer & Porter Co., Warminster, Pa.

[ * ] Notice: The portion of the term of this patent subsequent to Jul. 4, 1995 has been disclaimed.

[21] Appl. No.: 655,519

[22] Filed: Sep. 28, 1984

Related U.S. Application Data

[60] Continuation-in-part of Ser. No. 536,275, Sep. 27, 1983, Pat. No. 4,497,212, which is a division of Ser. No. 398,809, Jul. 16, 1982, Pat. No. 4,420,982, which is a division of Ser. No. 174,609, Aug. 1, 1980, Pat. No. 4,358,963, which is a continuation-in-part of Ser. No. 75,037, Sep. 12, 1979, Pat. No. 4,253,340, which is a continuation-in-part of Ser. No. 771,420, Jul. 4, 1978, Pat. No. 4,098,118, which is a division of Ser. No. 811,276, Jun. 29, 1977, Pat. No. 4,181,018.

[51] Int. Cl.$^4$ ............................................. G01F 1/58
[52] U.S. Cl. .................................................. 73/861.12
[58] Field of Search ........................ 73/861.12; 310/11

[56] References Cited

U.S. PATENT DOCUMENTS

| 4,098,118 | 7/1978 | Schmoock | 73/861.12 |
| 4,388,834 | 6/1983 | Schmoock | 73/861.12 |

FOREIGN PATENT DOCUMENTS

| 0116875 | 8/1984 | European Pat. Off. | 73/861.12 |
| 2040682 | 2/1972 | Fed. Rep. of Germany | 73/861.12 |
| 1072521 | 6/1967 | United Kingdom | 73/861.12 |
| 2068122 | 8/1981 | United Kingdom | 73/861.12 |

Primary Examiner—Herbert Goldstein
Attorney, Agent, or Firm—Michael Ebert

[57] ABSTRACT

A highly compact electromagnetic flowmeter unit interposable between the flanged ends of upstream and downstream line pipes for metering fluid passing through the line. The flowmeter is constituted by a cylindrical casing of ferromagnetic material within which a pair of electromagnet coils is supported at opposed positions along a diametrical axis normal to the longitudinal axis of the casing, the longitudinal axis passing through the central flow passage of an annular pressure vessel. The vessel, which is formed of high-strength insulating epoxy material, is molded within the casing and encapsulates the coils as well as a pair of pre-cast electrodes formed of conductive epoxy material disposed at diametrically-opposed positions with respect to the flow passage along a transverse axis at right angles to the coil axis to define a unitary structure. The epoxy of the electrodes is compatible with that of the vessel, whereby a fluid-impermeable bond is formed therebetween. The unit is compressible between the end flanges of the pipes by bridging bolts that pass through bore holes in the pressure vessel or lie outside the casing to encage the unit.

5 Claims, 4 Drawing Figures

UNITARY ELECTROMAGNETIC FLOWMETER HAVING MOLDED ELECTRODES

RELATED CASES

This application is a continuation-in-part of my application Ser. No. 536,275, filed Sept. 27, 1983, now U.S. Pat. No. 4,497,212, which is a division of my application Ser. No. 398,809, filed July 16, 1982 (now U.S. Pat. No. 4,420,982), which in turn is a division of an application Ser. No. 174,609, filed Aug. 1, 1980 (now U.S. Pat. No. 4,358,963), which is a continuation-in-part of my earlier application Ser. No. 075,037, filed Sept. 12, 1979 (now U.S. Pat. No. 4,253,340), which is a continuation-in-part of my still earlier application Ser. No. 771,420, filed July 4, 1978 (now U.S. Pat. No. 4,098,118, which is a division of an application Ser. No. 811,276, filed June 29, 1977 (now U.S. Pat. No. 4,181,018), the entire disclosures of these cases being incorporated herein by reference.

BACKGROUND OF INVENTION

1. Field of Invention

This invention relates generally to electromagnetic flowmeters, and more particularly to a flangeless flowmeter having a cylindrical housing and whose components are integrated to form a highly compact, low-cost unit that may be readily installed in a flow line between the flanged ends of the upstream and downstream pipes, the flowmeter including pre-cast electrodes of conductive epoxy material which are embedded in and bonded to a molded pressure vessel of insulating epoxy material to create a monolilithic structure.

2. Prior Art

Magnetic flowmeters such as those disclosed in U.S. Pat. Nos. 3,695,104; 3,824,856; 3,783,687 and 3,965,738, are especially adapted to measure the volumetric flow rates of fluids which present difficult handling problems, such as corrosive acids, sewage and slurries. Because the instrument is free of flow obstructions, it does not tend to plug or foul.

In a magnetic flowmeter, an electromagnetic field is generated whose lines of flux are mutually perpendicular to the longitudinal axis of the flow tube through which the fluid to be metered is conducted and to the transverse axis along which the electrodes are located at diametrically-opposed positions with respect to the tube. The operating principles are based on Faraday's law of induction, which states that the voltage induced across any conductor as it moves at right angles through a magnetic field will be proportional to the velocity of that conductor. The metered fluid effectively constitutes a series of fluid conductors moving through the magnetic field; the more rapid the rate of flow, the greater the instantaneous value of the voltage established at the electrodes.

The typical commercially-available magnetic flowmeter is provided with mounting flanges at either end thereof. The meter is interposed between the upstream and downstream pipes of a fluid line, each pipe having an end flange. The mounting flanges on the meter are bolted to the flanges of line pipes. It is, of course, essential that the circle of bolt holes on the mounting flanges of the meter match those on the pipe flanges.

In a magnetic flowmeter, the flow tube is subjected to the same fluid pressure as the line pipes. The flow tube must therefore be of a material and of a thickness sufficient to withstand this pressure, even though the strength of the flow tube is unrelated to its measuring function. This design factor contributes significantly to the cost of a standard meter. Existing meters are made up of components that must be assembled, and are generally of substantial size and weight and quite expensive to manufacture.

In order to provide a compact and readily installable electromagnetic flowmeter whose weight and dimensions are substantially smaller than existing types, the above-identified related patent applications and patents disclose highly compact flangeless flowmeters which, despite their reduced volume and weight, are capable of withstanding high fluid pressures, the flowmeters operating efficiently and reliably to accurately measure flow rates.

In applicant's related U.S. Pat. No. 4,098,118, the flowmeter is constituted by a cylindrical metal casing within which a pair of solenoids are supported at diametrically-opposed positions along a magnetic axis at right angles to the longitudinal axis of the casing which passes through the central flow passage of an annular pressure vessel.

This vessel, which is formed of high-strength insulating material, is molded within the casing and encapsulates both the solenoids and a pair of metal electrodes disposed at diametrically-opposed positions with respect to the flow passage along a transverse axis at right angles to the magnetic axis to define a unitary structure. This flangeless unit is compressible between the end flanges of the upstream and downstream pipes of the fluid line by bridging bolts which pass through bore holes in the pressure vessel or which lie outside the casing to encage the unit.

The faces of the electrodes are in contact with the fluid. While the electrodes are embedded in the pressure vessel and locked therein, the metallic surfaces thereof are not chemically bonded to the insulating material of the pressure vessel, nor does the metal of the electrodes have the same coefficient of thermal expansion as the insulating material.

As a consequence, the seal at the interface of the metal electrodes and the insulating vessel is weak and subject to rupture under high pressure or high-temperature operating conditions. Because the electrodes are embedded, a seal failure is not repairable; hence should the seal fail, it may be necessary to discard the entire unit.

In other metal electrode arrangements disclosed in the prior art, the meter electrodes are received in holders, gaskets and compression seals being provided to maintain a good seal under rigorous operating conditions. But such expedients add substantially to manufacturing and assembly costs.

Another drawback of metal electrodes is that when the fluid being metered is in the form of a slurry in which solid particles are dispersed in the fluid, the impingement of these particles on the metal faces of the electrodes give rise to noise which in some cases is so intense as to result in an unfavorable signal-to-noise ratio.

SUMMARY OF INVENTION

In view of the foregoing, the main object of this invention is to provide a flangeless electromagnetic flowmeter in which the electrodes are pre-cast of a conductive epoxy material and are embedded in the course of molding in an insulating vessel formed of insulating epoxy material which becomes bonded to the surface of the electrodes to create a positive seal in a monolithic structure which operates without danger of leakage over a wide temperature and pressure range.

More particularly, an object of this invention is to provide a monolithic structure of the above type in which the pre-cast electrodes and the insulating pressure vessel are formed of compatible epoxy materials having nearly identical coefficients of thermal expansion whereby the positive bond therebetween is unaffected by wide excursions in temperature.

A significant feature of the invention is that a leakage-free seal is effected for the electrodes without the need for gaskets and other conventional expedients for this purpose. A further advantage of the invention is that the precast, non-metallic electrodes yield a significantly lower noise output in slurry applications than standard metal meter electrodes.

Briefly stated, these objects are attained in a highly compact electromagnetic flowmeter unit interposable between the flanged ends of upstream and downstream line pipes for metering fluid passing through the line. The flowmeter is constituted by a cylindrical casing of ferromagnetic material within which a pair of electromagnet coils is supported at opposed positions along a diametrical axis normal to the longitudinal axis of the casing, the longitudinal axis passing through the central flow passage of an annular pressure vessel. The vessel, which is formed of high-strength insulating epoxy material, is molded within the casing and encapsulates the coils as well as a pair of pre-cast electrodes formed of conductive epoxy material disposed at diametrically-opposed positions with respect to the flow passage along a transverse axis at right angles to the coil axis to define a unitary structure. The epoxy of the electrodes is compatible with that of the vessel, whereby a fluid impermeable bond is formed therebetween. The unit is compressible between the end flanges of the pipes by bridging bolts that pass through bore holes in the pressure vessel or lie outside the casing to encage the unit.

OUTLINE OF DRAWINGS

For a better understanding of the invention as well as other objects and further features thereof, reference is made to the following detailed description to be read in conjunction with the accompanying drawings, wherein.

DESCRIPTION OF INVENTION

Figure 1:
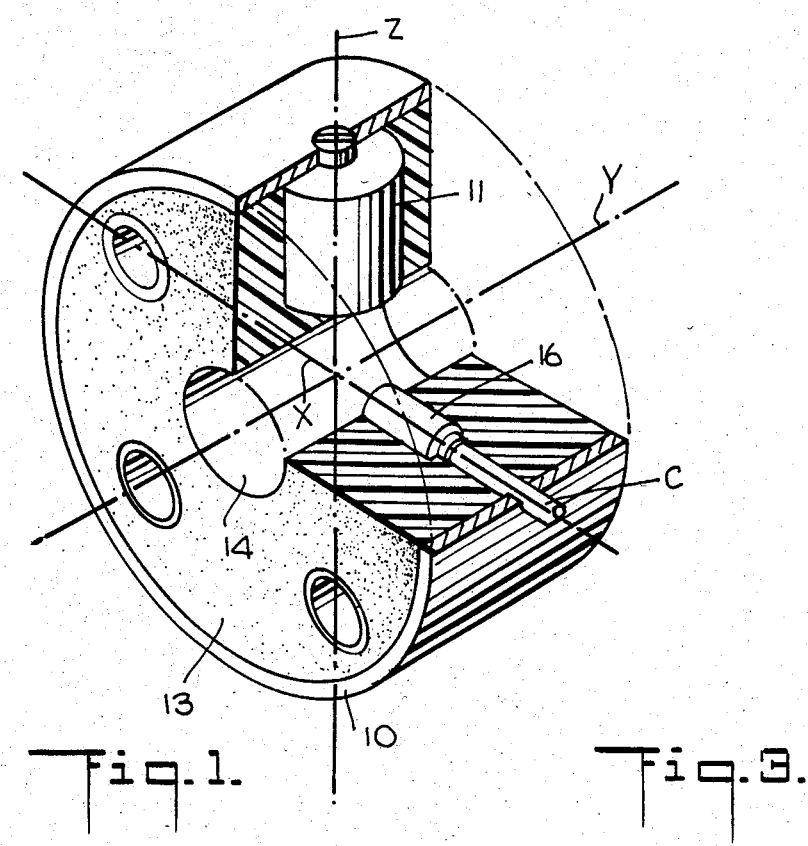
FIG. 1 is a perspective view of a flangeless electromagnetic flowmeter in accordance with the invention, with a sector of the structure cut away to expose some of the internal components.
Figure 2:
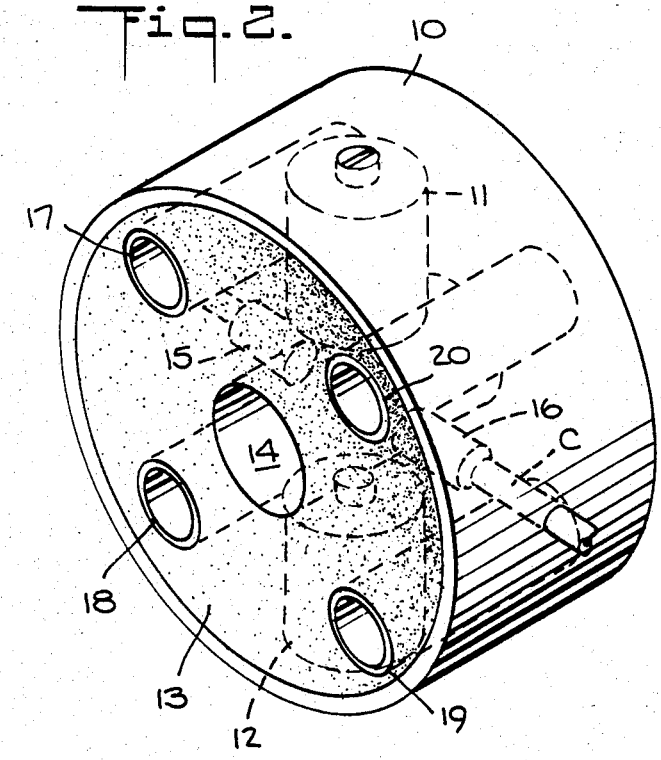
FIG. 2 is a perspective view of the same unit, with the internal components in phantom.

Referring now to FIGS. 1 and 2 showing a flangeless flowmeter in accordance with the invention, it will be seen that the unit includes a cylindrical casing 10 of ferromagnetic material, such as cold rolled steel. Supported within casing 10 is a pair of electromagnets 11 and 12 which occupy opposed positions along a diametrical magnet axis Z. Axis Z is normal to the longitudinal axis Y of the casing, which is also the flow axis of the unit.

Electromagnets 11 and 12 are conventional solenoids with a ferromagnetic core which may also be of cold rolled steel. The cores of the solenoids are bolted, screwed or otherwise attached to casing 10. Molded within casing 10 is an annular, high-strength pressure vessel 13 which defines a tubular conduit 14 coaxial with casing 10 and extending along flow axis Y to provide a fluid passage for the fluid to be metered. The diameter of conduit 14 matches that of the upstream and downstream pipes in the fluid line in which the unit is interposed.

The molded pressure vessel 13 encapsulates solenoids 11 and 12. Embedded in the pressure vessel is a pair of precast electrodes 15 and 16 formed of a conductive epoxy material. These non-metallic electrodes are in cylindrical form and have end faces which make contact with the fluid in conduit 14. They are disposed at diametrically opposed positions along a transverse electrode axis X which is mutually perpendicular to axes Y and Z.

Metal casing 10 functions as a magnetic return path for the electromagnets 11 and 12 which produce a field whose lines of magnetic flux are substantially parallel to magnet axis Z and mutually perpendicular to axes X and Y. The casing also acts to structurally reinforce pressure vessel 13 so that the unit is capable of withstanding exceptional high pressure.

Pressure vessel 13 is molded of an epoxy resin of the reactive type forming a tight, cross-linked polymer network characterized by toughness, good adhesiveness, corrosion and chemical resistance, as well as good dielectric properties. It may be a thermosetting resin based on the reactivity of the epoxide group, or from polyolefin oxidized with peracetic acid. An acceptable epoxy for this purpose of "Chocktite" marketed by Palmer Products.

Pre-cast electrodes 15 and 16 are formed by an electrically-conductive epoxy whose chemical properties are compatible with those of the conductive epoxy from which the pressure vessel is molded, and having nearly an identical thermal coefficient of expansion. Suitable for this purpose is "Eccobond 60L" marketed by Emerson and Cuming.

In making the unit, the electrodes are first cast of the conductive epoxy and are then supported by their cables within the casing in which the electromagnets are also mounted. The casing assembly is placed in a vertical position in a mold having a mandrel that is coaxial with the casing to define the flow conduit. The molding compound is then poured into the open top of the casing to fill the space between the casing and the mandrel, the compound flowing around the solenoids and the electrodes.

Because of the compatible characteristics of the pre-cast epoxy electrodes and the epoxy of the molding compound, as the molding compound cures, it fuses and integrates with the electrodes to form a monolithic structure in which there is a positive bond between the pressure vessel and the electrodes. In the case of the solenoids, these may be provided with a plastic wrapper which is bonded to the pressure vessel which encapsulates the solenoids. There is no need for a positive bond with the solenoids.

Figure 4:
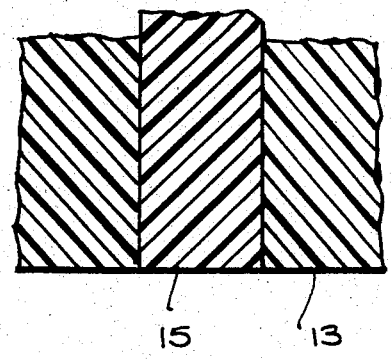
FIG. 4 is a section taken through one of the embedded meter electrodes.

Because of the integration of the electrodes and the pressure vessel, as shown in FIG. 4, no leakage occurs even at high fluid pressures, for there is no rupturable seam between the electrodes and the vessel. And since the electrodes and the vessel have nearly identical thermal characteristics, there is no differential expansion at high temperature causing a rupture therebetween.

Also embedded in the pressure vessel at equi-spaced positions on a circle concentric with tubular conduit 14 are four sleeves 17, 18, 19 and 20 which serve to define a circle of bores to receive mounting bolts bridging the flanges of the upstream and downstream pipes in which the unit is interposed. These sleeves may be made of insulating material such as Teflon (TFE), or of a thin ferromagnetic tube such as cold rolled steel.

Figure 3:
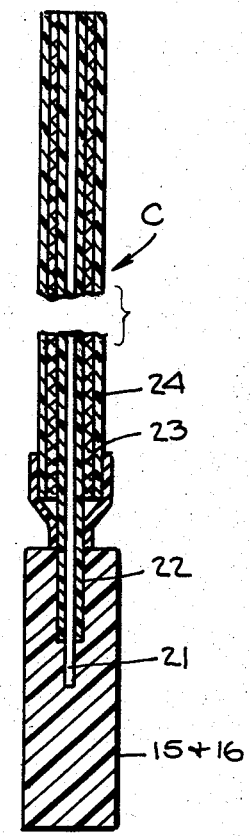
FIG. 3 is a section taken through one of the electrode assemblies.

Each pre-cast electrode, as shown in FIG. 3, has a connecting cable C in the form of a single lead wire 21 anchored therein, the wire being ensheathed in an insulating sleeve 22 (Teflon), surrounded by a braided wire shield 23, which in turn is covered by an insulating jacket 24 (Teflon). The connecting cables C are embedded in the pressure vessel and extend therefrom to external circuits through holes in the casing.

The manner in which the unit is installed is the same as that disclosed in my related U.S. Pat. No. 4,098,118. That is, the unit may be installed by passing the pipe flange bolts through the sleeves 17 to 20 which register with the bores in the mounting flange on the upstream and downstream pipes, the bolts when tightened serving to compress the unit between the flanges.

Or the unit, particularly in smaller sizes, may be made without internal sleeves and encaged by bolts surrounding the casing and bridging the mounting flanges to compress the unit between the pipe flanges. In either case, the flow conduit 14 must be in registration with the upstream and downstream pipes. In practice, gaskets may be placed at the ends of the unit to ensure an effective seal to prevent fluid leakage.

While there has been shown and described a preferred embodiment of a unitary electromagnetic flowmeter having molded electrodes in accordance with the invention, it will be appreciated that many changes and modifications may be made therein without, however, departing from the essential spirit thereof. Thus the invention is not limited to flangeless flowmeters and may be used in any flowmeter structure in which the flow conduit is defined by an annular pressure vessel formed of insulating epoxy.

I claim:

1. An electromagnetic flowmeter unit comprising:

A. a cylindrical ring of ferromagnetic material.
   B. a pair of electromagnets each having a coil wound about a ferromagnetic core attached at one end to the ring, the electromagnets being positioned with their cores extending along a diametrical axis at right angles to the longitudinal axis of the ring, the ring acting as a magnetic return path with respect to the electromagnets;
   C. an annular pressure vessel formed of epoxy insulating material molded within the ring and having a central flow pasasge through which the longitudinal flow axis extends, said vessel encapsulating the electromagnets, said ring also acting to reinforce said pressure vessel; and
   D. a pair of electrodes embedded in said pressure vessel at diametrically-opposed positions with respect to said flow passage along a transverse axis which is perpendicular both to said diametrical axis and to said longitudinal axis, said electrodes having end faces in contact with the fluid in said flow passage and being pre-cast of a conductive epoxy having nearly the same coefficient of expansion as the epoxy from which the pressure vessel is molded whereby when the pressure vessel is being molded, the epoxy molding material in the course of curing fuses with the surface of the pre-cast electrodes and integrate therewith to form a monolithic structure which is sealed with respect to said fluid.

2. A unit as set forth in claim 1, wherein said electromagnets are solenoids having cores attached to said casing.

3. A unit as set forth in claim 1, wherein said vessel has a series of sleeves extending therethrough, said sleeves being located on a circle concentric with the conduit to receive bolts which bridge the flanges of the pipes between which the unit is interposed.

4. A unit as set forth in claim 1, wherein said electrodes are in cylindrical form and are provided with a connecting cable including a single wire conductor anchored in said electrodes.

5. A unit as set forth in claim 4, wherein said cable further includes a braided wire shield concentric with said conductor.

* * * * *